United States Patent [19]

Saurenman

[11] Patent Number: 4,502,093
[45] Date of Patent: Feb. 26, 1985

[54] CONTROL OF STATIC NEUTRALIZATION EMPLOYING CABLES AND WIRES

[75] Inventor: Donald G. Saurenman, Whittier, Calif.

[73] Assignee: Consan Pacific Incorporated, Whittier, Calif.

[21] Appl. No.: 420,904

[22] Filed: Sep. 21, 1982

Related U.S. Application Data

[63] Continuation-in-part of Ser. No. 369,925, Apr. 19, 1982, , which is a continuation-in-part of Ser. No. 290,423, Aug. 6, 1981, Pat. No. 4,390,923, which is a continuation-in-part of Ser. No. 259,503, May 1, 1981, Pat. No. 4,388,667, which is a continuation-in-part of Ser. No. 241,684, Mar. 9, 1981, , which is a continuation-in-part of Ser. No. 124,242, Feb. 25, 1980, Pat. No. 4,282,830.

[51] Int. Cl.³ .............................................. H05F 3/06
[52] U.S. Cl. .................... 361/231; 361/215; 361/216; 361/232
[58] Field of Search ............... 174/175; 361/231, 232, 361/212, 215, 216

[56] References Cited

U.S. PATENT DOCUMENTS

| | | |
|---|---|---|
| 1,480,573 | 1/1924 | Smith . |
| 2,043,217 | 6/1936 | Yaglou . |
| 2,231,324 | 2/1941 | Crompton, Jr. . |
| 2,264,495 | 12/1941 | Wilner . |
| 2,565,454 | 8/1951 | MacKenzie et al. . |
| 2,585,799 | 2/1952 | Lawrence . |
| 2,641,804 | 6/1953 | Klein . |
| 2,765,975 | 10/1956 | Lindenblad . |
| 2,844,478 | 7/1958 | Hanley et al. . |
| 2,997,531 | 8/1961 | Oldham et al. ...................... 174/175 |
| 3,106,884 | 10/1963 | Dalve et al. . |
| 3,203,809 | 8/1965 | Visness et al. . |
| 3,288,054 | 11/1966 | Weprin et al. . |
| 3,308,344 | 3/1967 | Smith et al. . |
| 3,311,108 | 3/1957 | Cristofv et al. . |
| 3,324,515 | 6/1967 | West . |
| 3,358,289 | 12/1967 | Lee . |
| 3,396,703 | 8/1968 | Trussell . |
| 3,483,672 | 12/1969 | Jahnke . |
| 3,696,791 | 10/1972 | Saurenman et al. . |
| 3,757,491 | 9/1973 | Gourdine . |
| 3,818,269 | 6/1974 | Stark . |
| 3,870,946 | 3/1975 | Sandorf . |
| 3,976,916 | 8/1976 | Saurenman . |
| 4,072,762 | 2/1978 | Rhodes . |
| 4,139,879 | 2/1979 | Laws ................................ 361/231 X |
| 4,180,698 | 12/1979 | Carpenter, Jr. ................ 361/231 X |
| 4,208,438 | 6/1980 | Saurenman . |
| 4,250,804 | 2/1981 | Saurenman . |
| 4,282,830 | 8/1981 | Saurenman . |
| 4,319,302 | 3/1982 | Moulden . |
| 4,326,454 | 4/1982 | Saurenman . |
| 4,333,123 | 6/1982 | Moulden . |
| 4,388,667 | 6/1983 | Saurenman ..................... 361/216 X |
| 4,390,923 | 6/1983 | Saurenman ......................... 361/222 |

FOREIGN PATENT DOCUMENTS

| | | | |
|---|---|---|---|
| 1028351 | 5/1966 | United Kingdom . | |
| 1228655 | 4/1971 | United Kingdom ............... 361/222 |

Primary Examiner—Reinhard J. Eisenzopf
Attorney, Agent, or Firm—William W. Haefliger

[57] ABSTRACT

Apparatus to reduce static electricity in a work zone comprises:
(a) a first electrically conductive cable having tips spaced therealong to dispense positive ions in response to first voltage application to the first cable,
(b) a second electrically conductive cable having tips spaced therealong to dispense negative ions in response to second voltage application to the second cable, said first and second voltages being different, and
(c) spacers holding said cables at locations and separations from one another characterized in that static electricity at or proximate the work to be treated is effectively reduced to non-objectionable levels when said differential voltages are applied to the cables,
(d) and the spacers spaced apart along the lengths of the cables and said tips located in association with the spacers.

25 Claims, 21 Drawing Figures

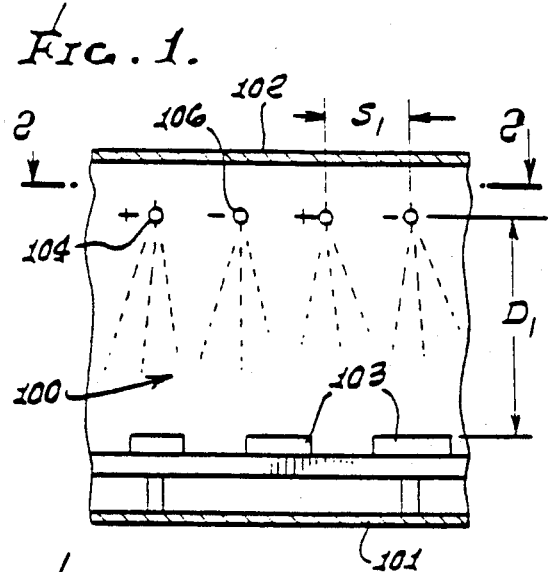
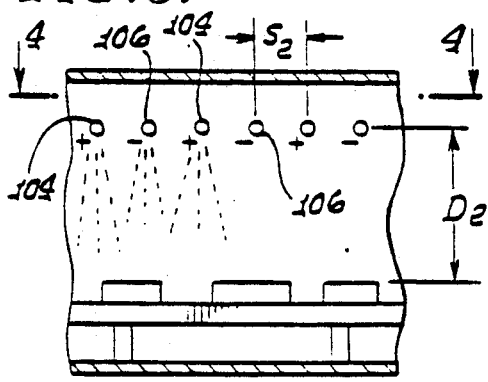
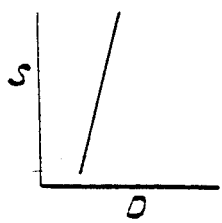
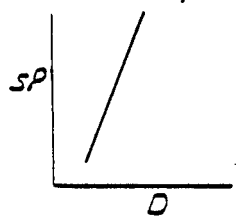
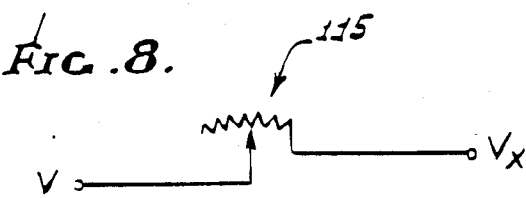
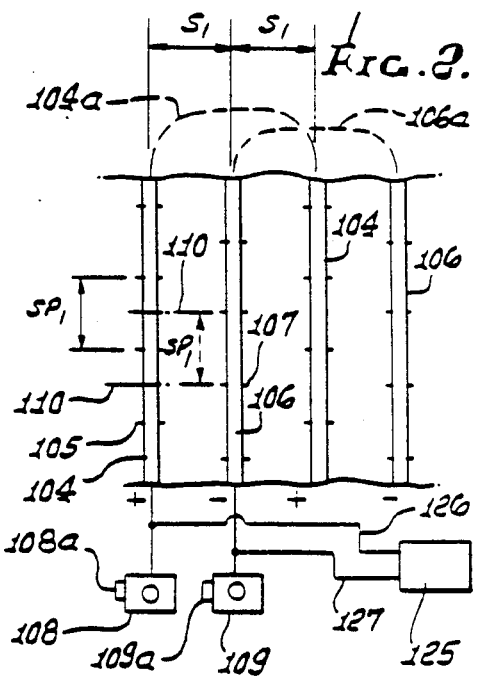
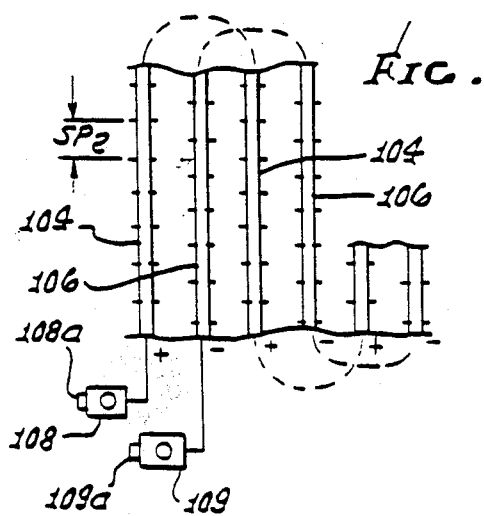
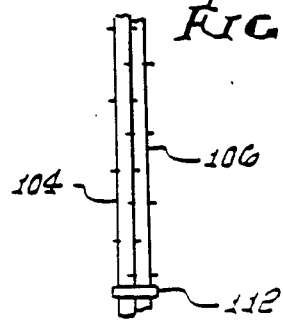

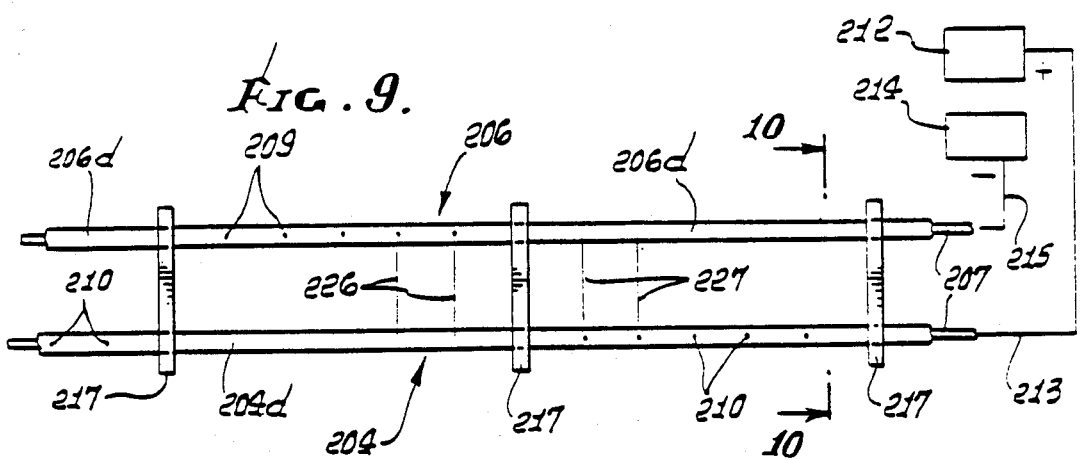
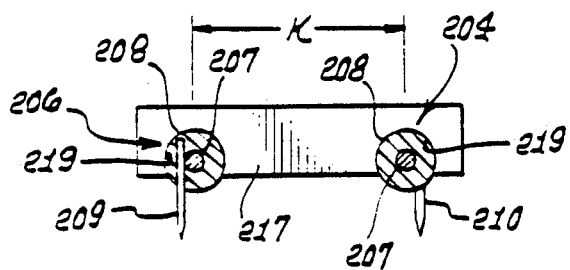
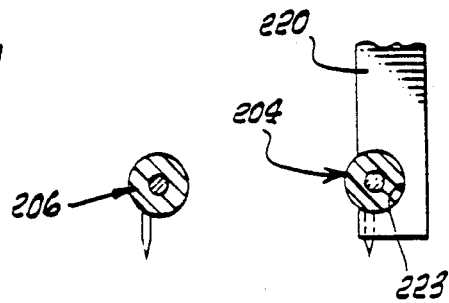
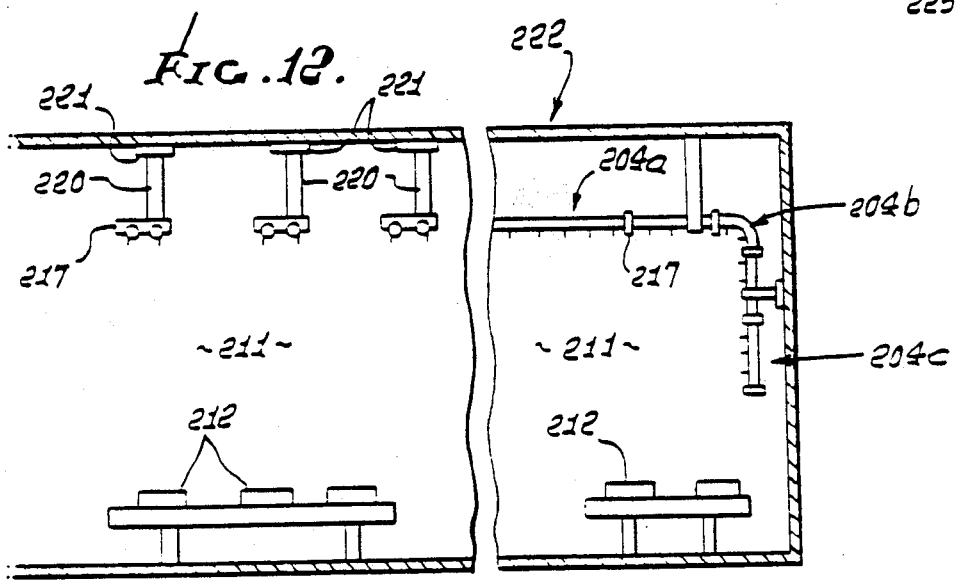

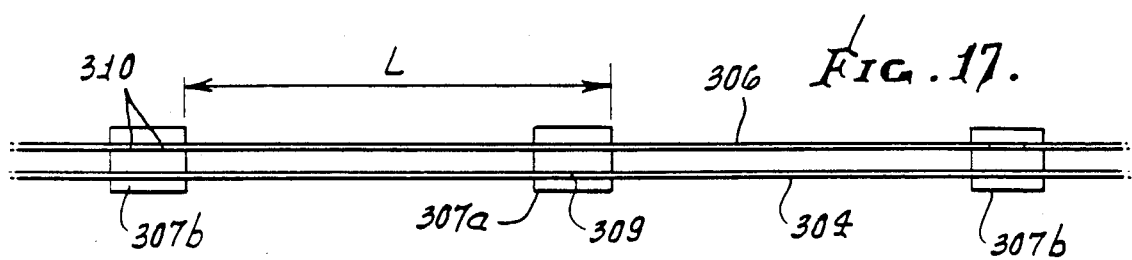
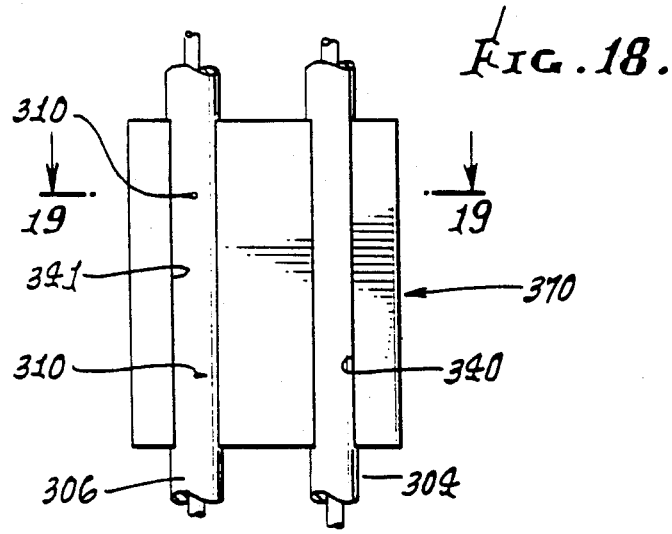
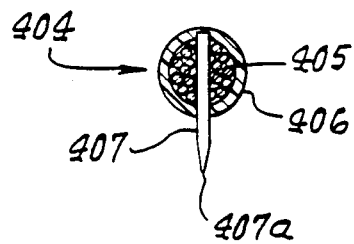
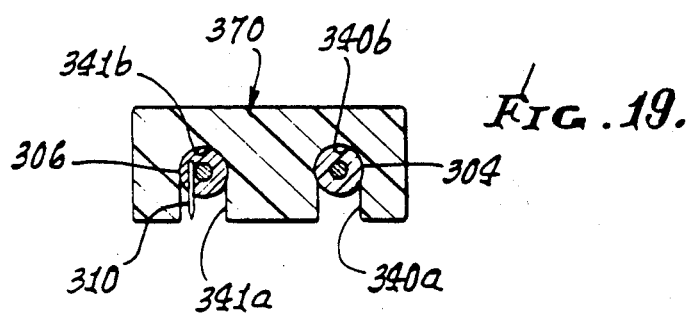
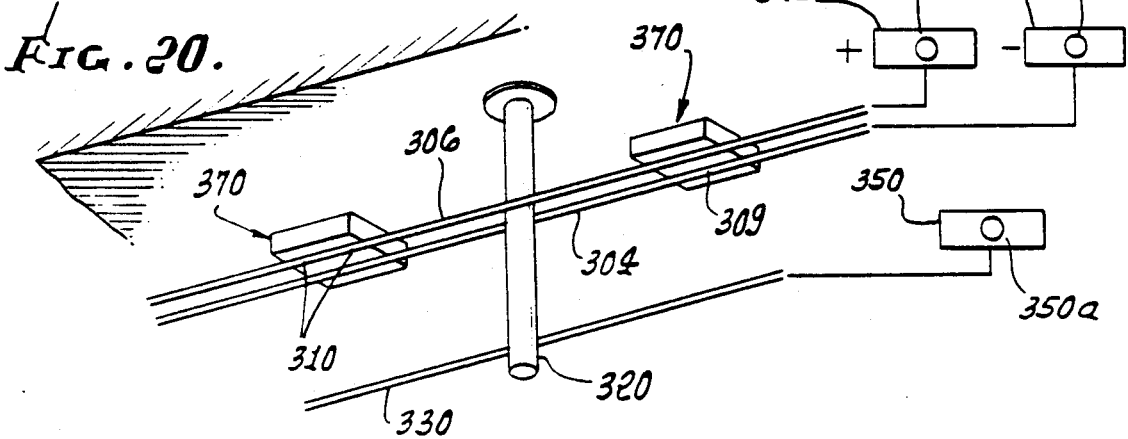

CONTROL OF STATIC NEUTRALIZATION EMPLOYING CABLES AND WIRES

BACKGROUND OF THE INVENTION

This application is a continuation-in-part of Ser. No. 369,925, filed Apr. 19, 1982, which is a continuation-in-part of Ser. No. 290,423, now U.S. Pat. No. 4,390,923, filed Aug. 6, 1981, which is a continuation-in-part of Ser. No. 259,503, filed May 1, 1981, now U.S. Pat. No. 4,388,667, which is a continuation-in-part of Ser. No. 241,684, filed Mar. 9, 1981, which is a continuation-in-part of Ser. No. 124,242, filed Feb. 25, 1980, now U.S. Pat. No. 4,282,830.

This invention relates generally to the provision of cable means with ion dispensing needles, located in zones for treatment of work such as plastic articles, animals and edibles, and electronics parts.

There is need for low cost, efficient means to induce collection of air-borne particles, and to suppress static build-up in certain article treating zones (electric parts production, plastic parts or material production, paper rolling apparatus, surgical operating rooms, clean room assemblies, and circuit board fabrication, etc.). Prior ion dispensing devices were not easily installable to conform to special requirements as to product shape, zone size, etc., and often did not achieve desired static neutralization contrary to expectations.

SUMMARY OF THE INVENTION

It is a major object of the invention to provide method and apparatus to achieve controlled neutralization or reduction of static charge on or associated with work, or to achieve controlled net positive or negative ion flux in areas at or adjacent to work.

The apparatus for reducing static electricity in a work zone basically conprises:

(a) first electrically conductive cable means having tips spaced therealong to dispense positive ions in response to first voltage application to the first cable means, (b) second electrically conductive cable means having tips spaced therealong to dispense negative ions in response to second voltage application to the second cable means, said first and second voltages being different, and (c) spacers holding said cable means at locations and separations from one another characterized in that static electricity at or proximate the work to be treated is effectively reduced to non-objectionable levels when said differential voltages are applied to the cable means, (d) and the spacers spaced apart along the lengths of the cables and said tips located in association with the spacers.

As will appear, the cables are typically flexible so as to bend and fit in different work areas; the spacers may typically have grooves in which the first and second cables are retained in such close alignment that tips on the two flexible cables project in generally the same direction, i.e. toward the work area, up or down; and auxiliary cable means may be provided, with controlled voltage application thereto, to enhance ion travel toward the work area to neutralize static. The cables may include cores consisting of wire strands penetrated by the needles.

As will also appear, pairs of cables, each with ion dispensing tips, are located at adjusted distances from the work, the cables of each pair having adjusted separation and being respectively adapted to receive positive and negative voltage application, the levels of which may be controlled, all for the purpose of achieving static charge neutralization or reduction at or adjacent the work. In addition, the spacing of the tips or needles on the cables is adjusted to achieve that objective.

Typically, groups of tips on the first cable of a pair are staggered relative to groups of needles on the second cable of that pair; and the tips are located in association with the spacers to achieve desired balance of positive and negative ions in the work zone toward which the tips project.

The invention enables static charge control in work zones, elimination of dangerous arcing in such zones, and control of net ion flux in animal or poultry zones and in edibles smoke houses, and clean rooms, to provide unusual advantages, as will appear.

These and other objects and advantages of the invention as well as the details of an illustrative embodiment, will be more fully understood from the following description and drawings, in which:

DRAWING DESCRIPTION

FIG. 1 is a side elevation showing an article treatment zone, with ion dispersing, static treatment cable means therein;

FIG. 2 is a plan view on lines 2—2 of FIG. 1;

FIG. 3 is another view like FIG. 1;

FIG. 4 is a plan view on lines 4—4 of FIG. 3;

FIG. 5 is a plan view of two cables connected together;

FIGS. 6 and 7 are graphs;

FIG. 8 is a circuit diagram;

FIG. 9 is a plan view of modified apparatus;

FIG. 10 is a section on lines 10—10 of FIG. 9;

FIG. 11 shows cable support;

FIG. 12 shows cables in an article treatment zone;

FIG. 17 is a plan view of cables retained by improved spacers;

FIG. 18 is an enlarged plan view of a spacer as shown in FIG. 17;

FIG. 19 is a section on lines 19—19 of FIG. 18;

FIG. 20 is a perspective view like FIG. 13, showing the FIGS. 17-19 spacers, and voltage adjustment of the cables as well as of an auxiliary wire; and FIG. 21 is a sectional view of a modified cable and needle.

DETAILED DESCRIPTION

Figure 13:
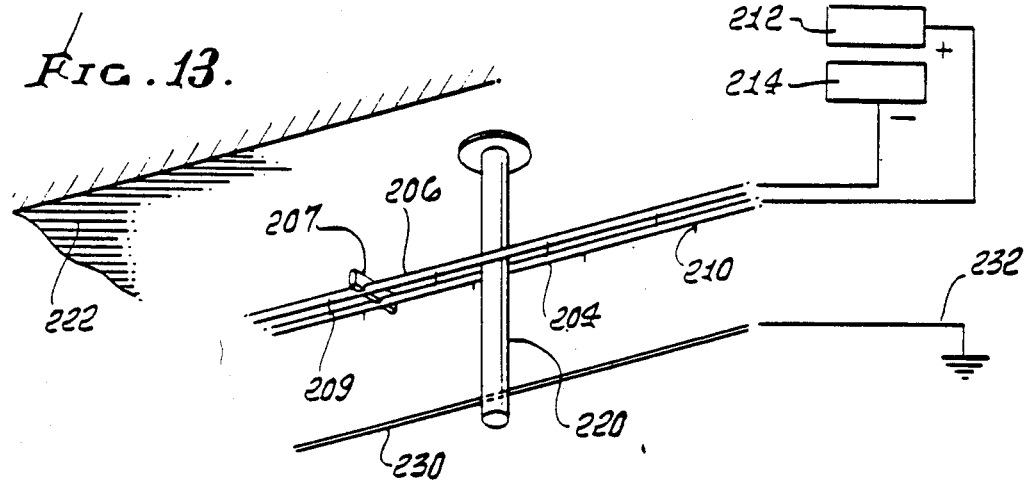
FIG. 13 is a perspective view showing a multiple cable and wire system.

FIG. 1, apparatus is shown for reducing or controlling static electricity in a work zone 100. The latter may be defined between a floor 101 and a ceiling 102. Located within that zone is work in the form of articles 103, which for example have static electricity associated with handling or other processing. Danger of fire may arise due to such charge build-up. Typical of such articles are foam plastic materials such as sheets, slabs, or pieces. Articles 103 may also represent poultry, animals, and food such as meat in a smoke house.

In accordance with the invention, first electrically conductive cable means is provided to have tips spaced therealong to dispense ions into the work zone in response to positive voltage application to the first cable means. See for example the first cables or cable lengths 104 having needle tips 105 spaced along the cables; the cables may be located generally above the work so that positive ions are dispensed from the needles to travel generally downwardly toward the work, but may move in various directions.

Second electrically conductive cable means is also provided to have tips spaced therealong for dispersing ions into the work zone in response to negative voltage application to the second cable means. See for example the second cables or cable lengths 106 having needle tips 107 spaced therealong. Such second cables may also be located generally above the work, so that negative ions are dispensed from the needles 107 to travel generally downwardly or otherwise in the zone and toward the work.

FIG. 2 shows a typical arrangement, with the first and second cables located in sidewardly separated, alternating relation, the cable lengths extending in generally parallel relation, with separation $S_1$. Cable bends 104a interconnect the parallel lengths 104, and cable bends 106a interconnect the lengths 106. DC voltage sources are shown at 108 and 109 respectively electrically connected with the cables 104 and 106. The cables may be formed as in FIGS. 2-4.

In accordance with an important aspect of the invention, the cable means are located at adjusted distances from the work (see distance $D_1$ for example) and at adjusted separations from one another (see separations $S_1$ for example), and characterized in that static electricity at or proximate the work is effectively reduced to non-objectionable levels when the described positive and negative voltages are applied to the cables. For example, the distances $D_1$ and the separations $S_1$ may be varied until static levels at the work are effectively eliminated. Note in this regard the spacings $SP_1$ between the needles on each of the cables 104 and 106, such spacings being approximately equal. Further, for best results, the cable 106 tips 107 are in positions to be intersected by perpendiculars 110 from the first cables 104 on either side of cable 106, such perpendiculars intersecting the first cables approximately mid-way between the tips 105.

In FIG. 3, the cables 104 and 106 are closer to the work, i.e. their distances $D_2$ from the work are less than cable distances $D_1$ from the work in FIG. 1. Further, to achieve static neutralization, the lateral separations $S_2$ of the cables are less than the lateral separations $S_1$ in FIG. 1; and FIG. 4 shows that the needle spacings $SP_2$ are less than the needle spacings $SP_1$ in FIG. 11. These relationships are further exemplified in FIG. 6 (showing that as D decreases, S is decreased for static neutralization) and in FIG. 7 (showing that as D decreases, SP is also decreased for static neutralization). In FIG. 5 the separation between cable lengths 104 and 106 has been decreased to the point where the cables are connected together, as by clip or tie 112.

EXAMPLE 1

Cables 104 and 106 were located at a distance $D_1$ (see FIG. 1) about 12 feet above floor level, i.e. 6 to 8 feet above the work. Static was neutralized when the positive and negative cables separation $S_1$ was 4 feet, and the needle spacing $SP_1$ was about 2 feet along each cable. The applied voltage were 18K-35K DC volts positive and 18K-35K DC volts negative.

EXAMPLE 2

Cables 104 and 106 were located at a distance $D_2$ (see FIG. 3) about 1-3 feet above the work. Static was neutralized when the positive and negative cables separators $S_2$ was 4 to 12 inches, and the needle spacing was about 3-6 inches along each cable. The applied voltages were 3K-18K DC volts positive to cables 104, and 3K-18K DC volts negative to cables 106.

In general the voltages applied to cables 104 and 106 should be about the same, but of opposite polarity; however, the voltages may be adjusted relative to one another, to achieve zero static voltage (as might be necessary where the work voltage continues to be biased positive or negative). Note the voltage adjustment controls 108a and 109a in the power supplies. As an example, FIG. 8 shows voltage V controlled to voltage $V_x$ by variable resistance 115. FIG. 2 shows circuitry such as a comparator 125 connected at 126 and 127 with outputs of 108 and 109 to provide a warming (light, sound, etc) if the system voltage fails or goes out of balance.

FIGS. 6 and 7 show the manner in which each of S and SP varies with D, to achieve static neutralization.

In the above relatively inflexible cables such as bars may be utilized, the bars also having busses and needles or tips, as described.

It is found that the combined effect of the positive and negative ions efficiently suppresses arcing (which can produce fire) otherwise due to positive or negative charge or static build-up on the articles or work. Also, air-borne particles are caused to collect on enclosure surfaces, to maintain the atmosphere in the work zone in clean condition.

Referring to FIGS. 9 and 10, first and second cable means appear at 204 and 206. Each cable includes an elongated conductive metal core 207, and a protective sleeve 208 of insulative, such as polypopylene or polyethylene, material. Ion dispensing tips, as formed for example by needles, are shown at 209 and 210. The tips project generally in the same direction, as toward work areas 211 seen in FIG. 12, there being work elements 212 such areas, to be made static free.

The cables are typically flexible so they can be strung in straight or curved lines or configuration. Note straight cable lengths 204a and 204c, and curved lengths or bends 204b in FIG. 12. Also the cable pair 204 and 206 has adjusted lateral separation characterized in that static electricity at or proximate the work is effectively reduced to non-objectionable level or levels when positive and negative voltages are applied to the respective cables. Note positive voltage source 212 connected at 213 to cable 204, and negative voltage source 214 connected at 215 to cable 206.

Spacers are provided as at 217 and located at selected positions along the cable to hold them at adjusted separation K. The latter is typically between ½ and 1½ inches. Such spacers are shown in the form of insulative plastic bars, having two notches 219 at K separation to removably receive the cables, sidewardly, i.e. with snap-in reception. The notches are sized to receive and firmly retain the cables, as shown in FIG. 10. The cables are frictionally held against rotation, and the needles or tips 209 and 210 are held projecting in the same direction, despite the bending of the parallel cables to conform to room geometry, as at 204b.

Holders are provided to support the cable pairs at selected spacing from enclosure structure. In the example, insulative plastic rods 220 are suitable attached at 221 to the ceiling or wall of enclosure 222, and support the cables. FIG. 11 shows the rod 220 having a side notch at 223, to receive a cable 204 or 206 of a connected pair.

Adjustment of the positive and negative ion dispensation by the tip groups 209 and 210 is also enabled to aid in achievement of substantial neutralization of static in work areas. In this regard, note in FIG. 9 that the tips 209 in cable 206 are sidewardly offset from a portion 204d of the cable 204 which contains no tips; and that tips 210 in cable 204 are sidewardly offset from a portion 206d of the cable 206 which contains no tips. Also, spacers 217 divide such staggered groups 209 and 210, as shown. Further, the tips or needles in each group can be selectively removed to reduce ion dispensation, to aid in achieving static neutralization. Thus, if there is an excess of + charge at a particular location in the work area, one or more needles 210 or tips carrying + charge and located closest to that area may be removed from cable 204, thereby to aid in achievement of charge balance in the work area. Alternatively needles 209 may be added to cable 206. The needles may be pulled from the cable, and re-inserted at will. Note in FIG. 10 that the needles extend adjacent the sides of the cores 207, and held in that position by the plastic sleeve.

An alternate static field balance technique is as shown in FIG. 8. It is found that when the static field in the area of the work is balanced, the static charge on the work itself is rapidly neutralized.

Also in FIG. 9, perpendiculars 226 from cable 204 intersect tips 209, such perpendiculars spaced from tips 210, and perpendiculars 227 from cable 206 intersect tips 210, such perpendiculars spaced from tips 209.

Tip protection means may also be provided on the cables 204 and 206.

From the above FIGS. 9-12 it will be seen that the method of substantially neutralizing static electricity at work in an extended work zone (the work occupying only a local relatively small portion of that zone) involves the steps:

(a) dispersing into the bulk of the extended work zone including said portion thereof both positive and negative ions, (b) such dispersing carried out to substantailly balance the positive and negative ion content in that portion of the zone.

Also, both positive and negative ions are dispersed from a large number of intermixed multiple points spaced about the extended zone.

Figure 14:
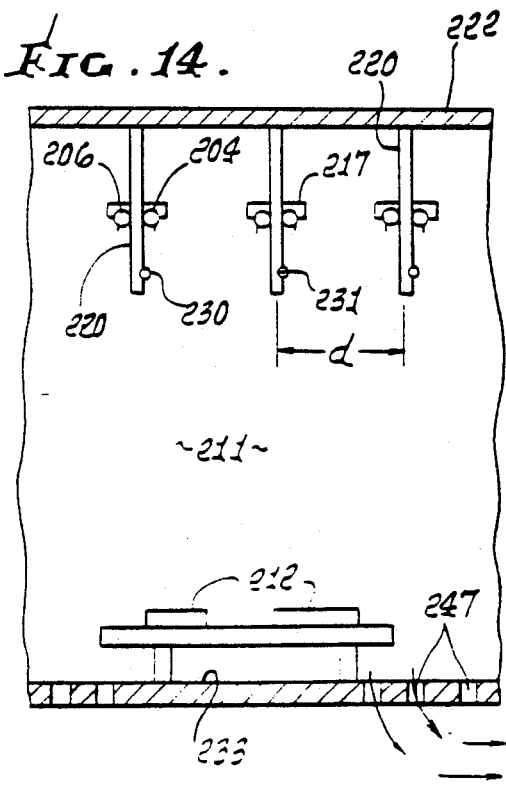
FIG. 14 is an elevation showing the FIG. 13 system installed in a clean room.

Referring now to FIGS. 13 and 14, elements which remain the same as in FIGS. 9-12 are given the same numbers.

The system includes not only the first and second cable means or cables 204 and 206, as before, but also auxiliary means spaced from the cable means in the general direction of ion flow or travel toward the work, such auxiliary means being at or near ground potential, and having exposed electrically conductive surface extent. In the example, the auxiliary means comprises a bare wire 230, aluminum or copper for example, which extends generally parallel to and below the cables 204 and 206. It may be supported, for example, by the insulative plastic rods 220, as in a side notch 231 in each rod. The wire 230, grounded as at 232, is centered generally below the high voltage, positive and negative cables 204 and 206, at a distance of between 3 and 12 inches therefrom, the optimum distance being between 4 and 6 inches. It is found that the grounded wire enhances static neutralization effect all the way to the floor 233, including the area of the work 212 at distances of 7-9 feet below the cables 204 and 206. Also, the second cable 230 tends to balance the positive and negative field ionization, thereby improving the static neutralization—even to zero in many cases. In this regard, pairs of cables 204 and 206, and wires 230, are typically separated by distance "d", which is 3-5 feet.

Figure 15:
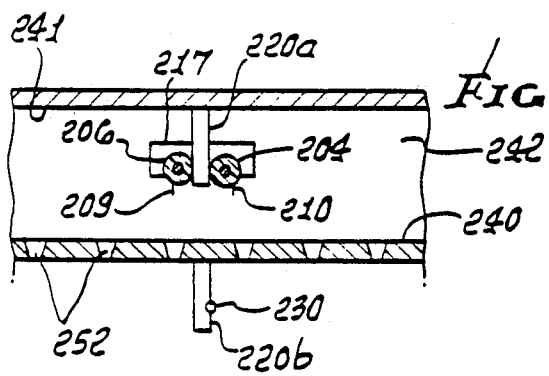
FIG. 15 is a fragmentary elevation showing the FIG. 13 system installed above a perforated, false ceiling.
Figure 16:
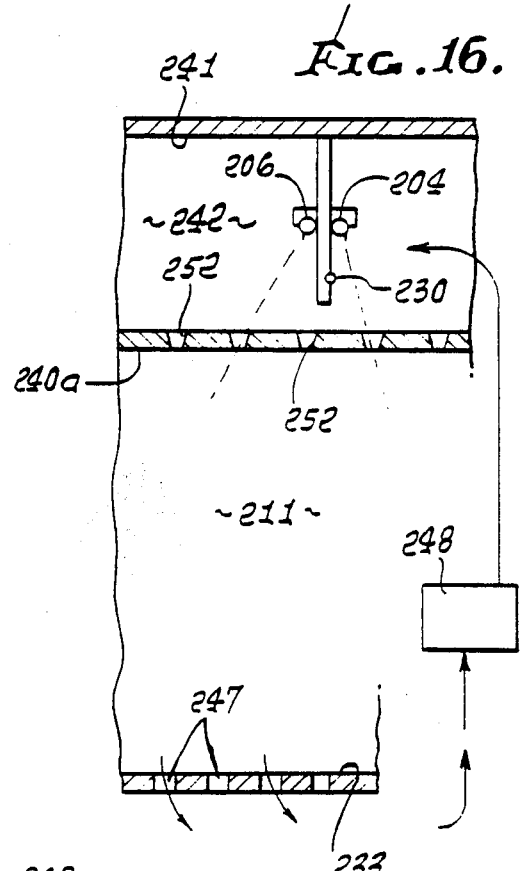
FIG. 16 is like FIG. 15.

In FIG. 15, a false, electrically insulative, ceiling panel 240 extends parallel to and below the structural ceiling 241, leaving a ceiling space 242 therebetween. Panel 240 is perforated at a large number of row and column locations, as at 252, to pass air as from space 242 into a work zone 211. The perforations may taper downwardly, and have upper entrance diameters of about ⅜ inch and lower exit diameters of about 5/16 inch. Cables 204 and 206 are suspended in space 242, as by plastic rods 220a, or other supports, to emit positive and negative ions via tips as referred to above. The ions then pass downwardly into zone 211 via perforations 252. Ground wire 230 is suspended by panel 242 and plastic support rods 220b below cables 204 and 206. The ground wire helps draw or attract the ions through the perforations 252. FIG. 16 shows a panel 240a, like panel 240, below cables 204 and 206 and also below ground wire 230. Floor 233 may be perforate as at 247 to pass air and dust from space 211 to a filter 248 and return to space 242.

In FIGS. 17-20, the cables 304 and 306 correspond to cables 204 and 206, respectively in FIG. 13, and the auxiliary wire 330 corresponds to wire 230 in FIG. 13. Rods 320 support the cables and wire as in FIG. 13. Wire 330 is supplied with voltage as from source 350, which is adjustable, and cables 304 and 306 are supplied with voltage from sources 312 and 314, which are adjustable. Typically, voltage from source 312 is more positive than voltage from source 314, and is therefore shown as +, whereas source 314 is shown as −. See adjustment knobs 312a, 314a and 350a. Voltage from source 350 may be neutral, (i.e. grounded), positive or negative. The function of wire 330 is to enhance static neutralization effect in the work area therebelow, as described in FIG. 13.

The improved spacers 370 have elongated parallel grooves 340 and 341 in which the cables 304 and 306 are retained at locations and separation from one another characterized in that static electricity at or proximate the work to be treated is effectively reduced to nonobjectionable levels when the differential voltages are applied to the cables 304 and 306. See in this regard the tips defined by needles 309 on cables 304 and needles 310 on cable 306. The needles are associated with the spacers, wherein the cables are gripped, so that the tips point in directionally controlled relation. The spacers are located along the cables at spacing L which varies between 3-4 inches and 2 feet. Needles 309 are associated with spacers which alternate with spacers associated with needles 310; and typically there are more needles 310 per unit length of cable than there are needles 309. An example is shown in FIG. 17, wherein spacers 307a carry one positive needle each, on cable 304, whereas alternate spacers 307b carry two needles, each, on cable 306. Needles 310 normally are negatively charged.

FIGS. 17-20 also show the provision of the spacers or cable spreaders in the form of molded plastic blocks 370 defining the parallel grooves 340 and 341. Pressure is exerted on the sides of the cables in the blocks, to hold the cables in place. The grooves have sideward entrance channels 340a and 341a, and enlarged interiors 340b and 341b communicating with the channels, for reception of the cables, with pressurization. The depths of the grooves are sufficient that the tips of the needles 310 are within channels 340a and 341a, to protect against snagging or injury to other apparatus or persons, especially when the cables are wound as during storage or shipment.

In FIG. 21 the cable 404 comprises multiple electrical wire strands 405 enclosed within insulative sheath 406. An electrically conductive needle 407 has been pressed into and through the bundle of strands 405 (the core) to spread apart at least some strands and to protrude at tip 407a. This construction enables rapid assembly of needles to the cable, and very good electrical contact of the needles to the core. Also the needle point is preserved, and not blunted by solid core metal. The needle tip may be tungsten coated, to resist corrosion.

I claim:

1. In apparatus for reducing static electricity in a work zone, the combination that includes:
   (a) first electrically conductive cable means having tips spaced therealong to dispense positive ions in response to first voltage application to the first cable means,
   (b) second electrically conductive cable means having tips spaced therealong to dispense negative ions in response to second voltage application to the second cable means, said first and second voltages being different, and
   (c) spacers carried by the cable means and holding said cable means at locations and separations from one another characterized in that static electricity at or proximate the work to be treated is effectively reduced to non-objectionable levels when said differential voltages are applied to the cable means,
   (d) and the spacers spaced apart along the lengths of the cables and said tips located in close association with the spacers,
   (e) said tips projecting in generally the same direction and said first and second cable means being flexible between said spacers,
   (f) and including auxiliary means spaced from the first and second cable means in the direction of ion flow therefrom toward the work, said auxiliary means being at a selected potential and having exposed electrically conductive surface extent, and control means connected with said auxiliary means to apply a controlled level of voltage thereto.

2. The combination of claim 1 wherein said tips are in portions of the cable means confined by the spacers.

3. The combination of claim 2 wherein only one of the two cable means confined by each spacer has said tip or tips thereon.

4. The combination of claim 2 wherein the first cable means is adapted to have positive voltage applied thereto, and the second cable means is adapted to have negative voltage applied thereto, there being about twice as many tips carried by the first cable means as there are tips carried by the second cable means, per unit length of the cable means.

5. The combination of one of claims 1 and 4 wherein said spacers comprise molded plastic blocks having two cable receiving grooves therein, the cables being retained snugly in the grooves with the tips pointing toward groove exterior.

6. The combination of claim 5 wherein the grooves have sideward cable entrance channels, and enlarged interiors communicating with said channels, for reception of the cables.

7. The combination of one of claims 1 and 2 wherein the first cable means is adapted to have positive voltage applied thereto, and the second cable means is adapted to have negative voltage applied thereto, there being a larger number of said tips carried by the first cable means than by the second cable means, per unit length of the cable means.

8. The combination of one of claims 1 and 4 including differential voltage sources operatively connected with said cable means.

9. The combination of one of claims 1, 2, 4 and 3 wherein the tips project in generally to same direction, the first and second cable means being flexible.

10. The combination of one of claims 1, 2, 4 and 3 including auxiliary means spaced from the first and second cable means in the direction of ion flow therefrom toward the work, said auxiliary means being at a selected potential and having exposed electrically conductive surface extent.

11. The combination of one of claims 1, 2, 3, and 4 including control means connected with at least one of said first and second cable means to control the voltage level applied thereto.

12. The combination of claim 1 including said work in said zone.

13. The combination of claim 12 wherein said work comprises synthetic plastic apparatus.

14. The combination of claim 12 wherein said work comprises edibles.

15. The combination of claim 12 wherein said work comprises animals or poultry.

16. The combination of claim 12 wherein said work comprises electronic apparatus.

17. The combination of claim 1 wherein said cable means include an insulating sheath enclosing multiple electrically conductive wire strands, the tips defined by needles pressed into the cable means to spread apart at least some of said strands.

18. The conbination of claim 7 wherein said tips consist of anti-corrosive metal.

19. In apparatus for reducing static electricity in a work zone, the combination that includes:
   (a) first electrically conductive cable means having tips spaced therealong to dispense positive ions in response to first voltage application to the first cable means,
   (b) second electrically conductive cable means having tips spaced therealong to dispense negative ions in response to second voltage application to the second cable means, and
   (c) said cable means located at separations from one another characterized in that static electricity at or proximate the work to be treated is effectively reduced to non-objectionable levels when said differential voltages are applied to the cable means,
   (d) and auxiliary means spaced from said first and second cable means in the direction of ion flow therefrom toward the work, said auxiliary means being at a selected potential and having exposed electrically conductive surface extent, and (e) means serving effectively as a potential control operatively connected with said auxiliary means to control the electrical potential thereof, (f) and spacers carried by the first and second cable means to bridge same, the cables being flexible between the spacers, the tips located at the spacers and held oriented to extend in substantially the same direction.

20. The combination of claim (10) 19 wherein said auxiliary means comprises wire means located to extend lengthwise in generally to the same direction as said first and second cable means.

21. The combination of claim 19 wherein said (e) means is connected with said (d) means.

22. In apparatus for controlling static electricity in a room, the combination that includes
(a) first means for dispensing positive ions throughout a selected area of a room,
(b) second means for dispensing negative ions throughout said selected area
(c) control means controlling said first and second means to achieve a selected balance of positive or negative ions in said selected area,
(d) said first and second means including, respectively, first tips distributed in the room and to which positive voltage is supplied, and second tips distributed in the room and to which negative voltage is supplied, the number and distribution of said tips selected to assist in said achievement of said selected ion balance, said first and second means also including a first cable connecting said first tips, and a second cable connecting said second tips, said control means including means supplying positive voltage to said first cable and negative voltage to said second cable,
(e) spacers interconnecting said first and second cables which are flexible between the spacers, the tips closely associated with the spacers,
(f) and auxiliary means spaced from said first and second cable means in the direction of ion flow therefrom toward the work, said auxiliary means being at a selected potential and having exposed electrically conductive surface extent, and control means connected with said auxiliary means to apply a controlled level of voltage thereto.

23. The combination of claim 22 wherein
(a) each said cable means includes an insulative sheath enclosing multiple electrically conductive wire strands, and
(b) at least one needle pressed into the cable means to spread apart at least some of said strands, the needle or needles defining said tip or tips protruding from the cable means.

24. The improvement of claim 23 wherein said tips consist of anti-corrosive metal.

25. The improvement of claim 24 wherein said metal consists of tungsten.

* * * * *